T. J. Kindleberger,
Water Wheel,

Nº 36,846. Patented Nov. 4, 1862.

Witnesses.

Inventor.
T. J. Kindleberger
by Munn & Co
atty

UNITED STATES PATENT OFFICE.

TOBIAS J. KINDLEBERGER, OF SPRINGFIELD, OHIO.

IMPROVEMENT IN WATER-WHEELS.

Specification forming part of Letters Patent No. 36,846, dated November 4, 1862.

*To all whom it may concern:*

Be it known that I, TOBIAS J. KINDLEBERGER, of Springfield, in the county of Clark and State of Ohio, have invented a new and Improved Water-Wheel; and I do hereby declare that the following is a full, clear, and exact description of the same, reference being had to the accompanying drawings, making a part of this specification, in which—

Figure 1:
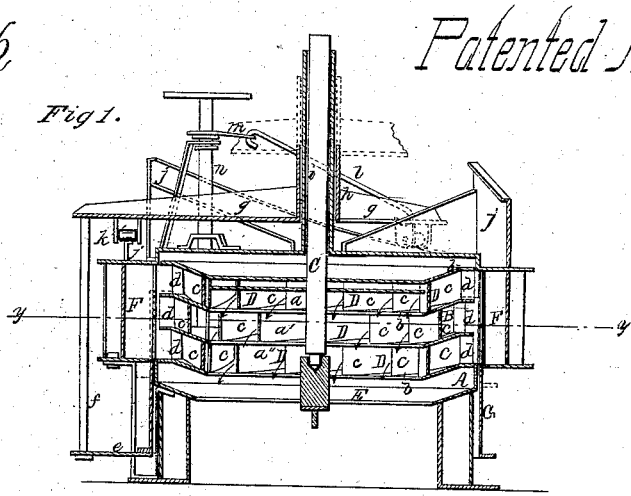
Figure 2:
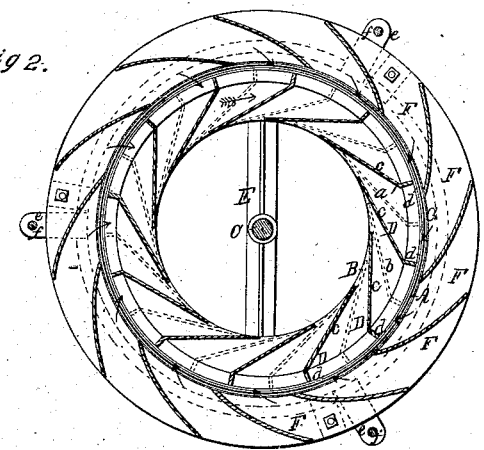
Figure 3:
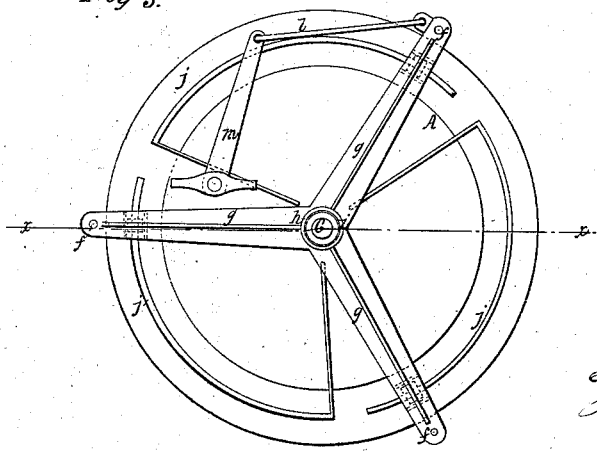

Figure 1 is a vertical central section of my invention, taken in the line $x\,x$, Fig. 3; Fig. 2, a horizontal section of the same, taken in the line $y\,y$, Fig. 1. Fig. 3 is a plan or top view of the same.

Similar letters of reference indicate corresponding parts in the several figures.

This invention relates to an improved horizontal water-wheel of that class in which the water is discharged at the center, and are generally termed "center-vent wheels."

The invention consists in the employment or use of a plurality of wheels placed one over the other on the same shaft and provided with buckets, the outer portions of which have a radial position in the wheels and the other portions an oblique or tangential and inclined position. The wheels are placed within a cylinder provided with chutes, and a cylindrical gate is placed between the chutes and the wheels, all being arranged in such a manner that a large percentage of the power of the water is obtained when the wheel is working at its maximum and a less power than the maximum obtained, when required, without expending any more than a corresponding decrease of water.

To enable those skilled in the art to fully understand and construct my invention, I will proceed to describe it.

A represents a cylinder in which the wheel B is placed. This wheel is placed on a vertical shaft C, and is strictly three wheels placed one upon the other, as indicated by $a\,a'\,a''$ in Fig. 1. Each wheel or part of the wheel is formed of annular plates $b$, between which the buckets D are placed. The plates $b$ have an inclined position extending downward from their outer to their inner edges, as shown in Fig. 1. This inclination of the plates $b$ of course gives an inclination to the main portion of the buckets D. The main portions of the buckets, which I term the "inner" parts and which are designated by $c$, have a tangential position in the wheel, while the outer parts, which are designated by $d$, have a radial position. The tangential portions $c$ of the buckets are inclined downward, corresponding to the inclination of the plates $b$, between which they are secured; but the outer parts $d$, which are comparatively short, have a horizontal as well as a radial position. (See Fig. 1.) The shaft C of the wheel is stepped in a cross-bar E in the cylinder A, and the upper part of said cylinder is encompassed by a series of chutes which are slightly curved and so arranged or disposed as to cause the water to strike the outer parts $d$ of the buckets at right angles. (See Fig. 2.) The cylinder A is encompassed by a cylindrical gate G, which works upward within the chutes F between them and the wheel B. The lower end of the cylinder A has three arms $e$ attached to it, which project horizontally from the cylinder and have vertical rods $f$ secured to their outer ends. The upper ends of the rods $f$ are connected to arms $g$, which project radially from a cylindrical slide $h$, placed loosely on a tube $i$, which projects vertically upward from the center of the cylinder A, the tube $i$ serving as a bearing for the upper part of the shaft C. (See Fig. 1.)

On the upper surface of the cylinder A there are placed three curved inclined ways $j\,j\,j$, on which the arms $g$ or friction-rollers $k$ attached thereto rest or bear. One of these arms $g$ is connected by a link $l$ with an arm $m$, which is attached to a vertical shaft $n$ on the upper part of cylinder A.

The operation is as follows: By turning the arm $m$, so that the arms $g$ will be wound up on the inclined ways $j$, the gate G will be raised and may be made to cover the inner orifices of the chutes and shut the water entirely off from the wheel. When the gate is fully lowered, the chutes are opened and the water acts upon the buckets of all the parts $a\,a'\,a''$ of the wheel. The first action of the water is that of impact against the outer radial and horizontal parts $d$ of the buckets, and the next action is that produced by the gravity of the water in passing downward and against the inner tangential parts $c$. When the gate G is fully down, the maximum power of the wheel is obtained. If rather less than the maximum power is required, the gate is raised so as to cover the buckets of the lower part $a''$ of the wheel. If still less power is required, the gate is raised higher so as to cover the buckets of the part $a'$, leaving the buckets of the part $a$ only exposed to the action of the water. By this arrangement it will be seen that the capacity of the wheel is diminished according to the diminution of the power required, and the wheel consequently, when running, and when less than its maximum power is given out is not propelled by more than a corresponding volume of water. This result is not attained by an ordinary wheel in which a diminution in the supply of water is alone depended upon for decreasing the power of the wheel or running it at less than its maximum, for if the capacity of the wheel be not correspondingly diminished the expenditure of water is proportionally greater than when the wheel is running and giving out its maximum power.

I would remark that the cylinder A is placed within a proper penstock from which the water passes through the chutes F to the wheel.

I do not claim, broadly and separately, a cylindrical gate, for they have been previously used; but What I do claim as new, and desire to secure by Letters Patent, is—

1. The wheel B, placed within the cylinder A, and composed of a plurality of parts $a\ a'\ a''$, (three, more or less,) provided with buckets D, formed of an inner tangential and inclined portion $c$ and a horizontal and radial outer portion $d$, in connection with the chutes F and cylindrical gate G, all arranged substantially as and for the purpose specified.

2. The arms $g$, connected to the gate by rods $f$, said arms resting or bearing on the curved inclined ways $j$ on the top of the cylinder A, and the arms $g$, turned upon the inclined ways $j$ by means of the arm $m$, attached to shaft $n$, and link $l$, substantially as described.

TOBIAS J. KINDLEBERGER.

Witnesses:
REUBEN MILLER,
MATTIE KINDLEBERGER.